United States Patent [19]

Devenish et al.

[11] 4,005,943
[45] Feb. 1, 1977

[54] RESILIENT STRUCTURES

[75] Inventors: Graham Frampton Devenish; Peter Christopher Dickson, both of Liverpool, England

[73] Assignee: Dunlop Limited, London, England

[22] Filed: Dec. 2, 1974

[21] Appl. No.: 528,626

[30] Foreign Application Priority Data

Feb. 19, 1974 United Kingdom ............... 7592/74

[52] U.S. Cl. ................................. 404/41; 404/35; 52/604; 15/215

[51] Int. Cl.² ..................................... E01C 5/00

[58] Field of Search ................. 404/41, 35, 34, 19, 404/42; 52/664, 730, 604, 668, 593; 15/215, 238, 239

[56] References Cited

UNITED STATES PATENTS

| | | | |
|---|---|---|---|
| 475,724 | 5/1892 | Curtis | 404/29 |
| 651,590 | 6/1900 | Brightman | 15/238 X |
| 692,242 | 2/1902 | Coomber | 52/593 X |
| 1,160,201 | 11/1915 | Ryberg | 15/239 |
| 1,974,279 | 9/1934 | Jones | 404/32 X |
| 2,069,391 | 2/1937 | Sample | 15/238 X |
| 2,352,892 | 7/1944 | Greulich | 404/35 |
| 2,426,943 | 9/1947 | Morden | 52/593 X |
| 2,505,509 | 4/1950 | Varela | 15/239 X |
| 2,737,092 | 3/1956 | Gramelspacher | 404/28 |
| 2,999,431 | 9/1961 | Mitchell | 404/32 X |
| 3,301,148 | 1/1967 | Schraudenbach | 404/19 |
| 3,322,047 | 5/1967 | Bieber | 404/28 |

*Primary Examiner*—Nile C. Byers, Jr.
*Attorney, Agent, or Firm*—Stevens, Davis, Miller & Mosher

[57] ABSTRACT

A resilient open-comparted three-dimensional structure suitable for use as a ground surface covering comprising an interlocked assembly of two pluralities of strips respectively formed at intervals with apertures and profiled regions which co-operate to interlock together the two pluralities of strips, a slit, slot, groove or the like extending into each aperture to facilitate interlocking of the two pluralities of strips. Two or more such structures may be superimposed on one another and a layer of resilient material may be provided between superimposed structures.

11 Claims, 8 Drawing Figures

RESILIENT STRUCTURES

This invention relates to resilient structures, including surface coverings and in particular, though not exclusively, to open three-dimensional structures for use as covers for ground surfaces, roads and floors.

It is known to construct floor and other surface coverings, such as door mats, from strips of deformable polymeric material, and often scrap material from vehicle tires or rubber conveyor belting is used in these constructions in order to assist in minimizing the cost of the article. There does however remain a not insignificant cost in manufacturing a three-dimensional structure of this kind. Commonly holes are punched in the strips which are then assembled together by link wires passing through the holes of successive strips or alternatively adhesives have to be used to secure the strips relative to each other, but both techniques are time-consuming and represent a cost factor which is significant in relation to the cost of the scrap materials being used.

In addition to manufacturing cost another disadvantage of three-dimensional structures of the aforementioned kind is that they are substantially hard and rigid and therefore are not entirely suitable for use in situations where it is desirable that they should absorb impact energy and reduce shock.

A further disadvantage of previously used constructions of resilient floor coverings when made from rubber is that when used in the presence of water which acts as a lubricant for rubber they do not provide a good grip for vehicles or pedestrians, and also may tend to slip relative to the surfaces on which they are placed.

One object of the present invention is to provide an improved resilient structure.

According to one aspect of the present invention a resilient open-compartmented three-dimensional structure comprises an interlocked assembly of a first plurality of strips of resilient deformable material each formed at intervals with an aperture, and a second plurality of strips each formed at intervals with a profiled region which cooperates with an aperture of a resilient deformable first strip, the apertures and profiled regions serving to interlock together the two pluralities of strips, the deformable first strips each having a slit, slot, groove or the like extending into each aperture to facilitate passage of the profiled regions of the second strips into the said apertures.

According to another aspect of the present invention a surface comprises a resilient open-compartmented three-dimensional structure as described in the preceding paragraph wherein the compartments are at least partly filled with a ballast material.

The ballast material may, for example, be sand, gravel, earth, grass, grass cuttings or other suitable materials.

Preferably the or each second deformable strip is formed from a resilient material, which may be the same material as the resilient deformable strips of the first plurality of strips.

The profiled region of each second strip may be achieved by, for example, forming recesses in its surface or, for example, by forming an aperture in the second strip.

The strips of the two pluralities preferably are arranged substantially parallel to each other, with a strip of one plurality linking along its length two strips of the other plurality.

In this type of construction it is particularly preferable that the strips of both pluralities are formed of resilient deformable material so as to provide a construction having good energy absorbing properties, and the strips of each plurality may be formed with both apertures and profiled regions so that the strips of both the pluralities of strips are substantially identical. Alternatively strips of a first plurality may be formed with two sets of apertures and strips of the other plurality may be formed with two sets of profiled regions so that one set of apertures of a first strip serve to connect the strip to one strip of the second plurality and the other set of apertures of said first strip serve to connect it to another strip of the second plurality. Any number of strips may be linked together as required to form a section, and separate sections may be linked together to form a larger section.

The lengths of the strips in the structure may be such that in the final assembly edges of the strips are flush with each other at both ends of the structure or alternatively at least some strips may be arranged to be inset or to protrude relative to other strips at at least one of the edges of the structure. Hence the strips may be arranged in the assembly so that sections can be linked together in the general direction of the lengths of the strips to form a larger section.

The strip of one plurality may be arranged normally to lie in a plane disposed substantially perpendicular to the plane containing a strip of the other plurality or at any other desired angle. Furthermore the strips of the two pluralities preferably are disposed normally at equal angles of inclination to the plane in which the assembly of strips lie, or they may be disposed at different angles, both the relative angle between adjacent strips and the inclination of the strips to the general plane in which the assembly of strips lie being selected to assist in providing a three-dimensional structure having the desired resilience and shock absorbing properties.

In a further alternative strips of the two pluralities may be disposed normally respectively substantially parallel with and perpendicular to the general plane in which the assembly of strips lies.

In addition to structures as described above the invention also provides structure assemblies comprising two or more structures laid one upon the other. Two structures may be linked together and held in multi-layer form by providing one structure with some strips of greater width or size than other strips of said structure so that strips of the other structure may be interlocked with the strips of greater width or size to unite the structures. Alternatively two or more layers may be retained in superimposed relationship by means other than the strips of the structures; for example by the use of adhesive, cords, straps, or metal fittings such as staples.

Two or more layers may be arranged adjacent each other or may be spaced from each other. In the latter arrangement a layer of material, which may be an energy absorbing material such as foam, may be provided in the space or spaces between successive layers of the multi-layer assembly so as to provide a sandwich-type assembly.

As an alternative to the strips of the two pluralities being arranged substantially parallel to each other, each strip of one plurality may be arranged angled at right angles to the strip of the other plurality so as in effect to form a two-dimensional network with the strips defining compartments of rectangular cross-sectional shape therebetween. In a modification of this construction the strips of the respective pluralities may be angled other than at right angles relative to each other such that they define spaces of parallelogrammatic cross-sectional shape therebetween.

The apertures preferably are of non-circular shape and the profiled region of the or each second strip preferably is arranged to co-operate with an aperture in such a manner that the second strip is held substantially securely relative to a first strip and restrained from angular movement in the aperture.

A strip of the second plurality may be arranged to intersect a deformable strip of the first plurality either at right angles to or at an angle inclined to the direction of the general length of the strip of the first plurality, considered in the plane of the strip thereof. Strips of the second plurality may be arranged to intersect those of the first plurality either all at the same angles or at least some at different angles to each other. They may be arranged in either regular or irregular patterns.

Similarly, in addition or alternatively to the configurations of the preceding paragraph, further alternative constructions of the resilient structure of the invention may be obtained by likewise varying the angle of intersection of strips of the first plurality with strips of the second plurality.

In other alternative constructions there may be provided a staggered interlock configuration in which an interlock is not formed at each intersection. When an interlock is not formed, the strips are suitably apertured to provide for their intersection.

As in the case of structures in which strips of both pluralities are parallel to one another, in the present case where strips of the two pluralities are angled (i.e. non-parallel) relative to each other two or more layers may likewise be arranged in superimposed form, and may be interposed with layers of other material to form a sandwich-type resilient assembly.

Irrespective of whether the strips of the two pluralities are parallel or angled relative to each other, each strip may be of any suitable shape in a cross-sectional plane perpendicular to the general direction of the length of the strip, and preferably is of a rectangular shape in said cross-sectional plane. Additionally or alternatively the thickness of a strip may be non-uniform; the thickness may vary across the width of the strip and/or along the length of the strip.

The cross-sectional shapes and sizes of the strips, the materials from which they are formed, and the spacing between interlocks may be selected to result in a structure having the desired resilience. Likewise, these factors, and in particular the materials selected for forming the strips, may be selected to result in a structure having the desired rebound characteristics.

The edges of each strip, in the direction of the length of each strip, may be substantially straight so as to form a three-dimensional structure which in effect lies between substantially flat, planar surfaces. Alternatively at least some of the strips may be profiled along their lengths so as to form a structure which in effect lies between surfaces of which one at least is contoured, e.g. wavy.

The widths of the strips in a structure may be such that in the final assembly edges of intersecting strips are substantially flush with each other at their intersections at both sides of the structure. Alternatively at least some strips on one or both sides of the structure may be arranged to be offset and thus be inset or protrude relative to an intersected strip at their intersection. Likewise, strips may be offset when considered at positions between intersections.

When the material of a first strip is slit etc. to facilitate assembly it is preferably formed with a slit etc. extending between the aperture and an edge of the strip so that material of the strip in the region of the slit etc. may be deformed temporarily to permit insertion of a second strip within the aperture. In particular, in the case of strips of the second plurality having a generally rectangular cross-sectional shape and the strips of the two pluralities being angled relative to each other (i.e. not substantially parallel), the general direction of the cut may be angled relative to a plane containing the finally located strip, disposed within the aperture from which the cut extends, so as to minimize any tendency, such as may occur if the direction of the cut lies is within the plane of the assembled second strip, for the second strip to become displaced from the aperture during use of the structure. In general the slits etc. may be straight or curved and at any angle to the plane containing the finally located strip.

Compartments formed by spaces between successive strips may be filled at least partially with suitable ballast material such as sand, ash, earth or earth and grass, to modify the resilience and other properties of the three-dimensional structures as desired. The compartments may be of a form open at both upper and lower faces of the structure so that ballast may extend between opposite faces of the structure, so that grass may grow therethrough, and so that water may drain readily therethrough, or the compartments may be of a partly closed form, i.e. open only at one surface of the structure as may be achieved by suitable angling of the strips, so that ballast material or growing grass for example may be contained in and supported by the structure. The latter arrangement clearly enables ballast material to be moved with the structure whenever the structure is moved, as compared with a structure having compartments open at both faces and which when moved would normally leave behind the ballast material.

Structures in accordance with the present invention are particularly suitable for use as or in forming part of ground covering materials, in particular where it is desired temporarily or otherwise to modify the characteristics of an existing surface. Thus, for example, in situations such as where a packed earth, ash, hard concrete or tarmacadam road crosses a horse racing course and it is desired to soften the surface for the duration of a race meeting, this may be achieved by making use of structures in accordance with the invention. The structures may be covered with, for example, straw or grass cuttings, for appearance. The surface may be constructed to be able to withstand an energy input and absorb energy without producing any significant rebound such as a trampolene effect and without making excessive noise. The compartments, whether open or partly closed, formed between strips of the structure may be at least partly filled with earth and covered with grass cuttings or other material to assist in obtaining the desired surface appearance, or grass may be allowed to grow through open compartments or in partly-closed compartments.

Particularly where it is desired to provide a ground surface covering which is both relatively easily movable and which has vegetation such as grass growing in or through it, a layer of vegetation cohering means may be provided attached, for example by the use of adhesives, alongside a surface of the resilient structure to assist roots to cohere relative to one another and to the structure and thereby resist tearing and undue root damage when the surface covering is being hauled over a surface. The cohering means may be a layer of an initially open-structural material such as a polyurethane foam-like material, or it may be of a material which becomes open-structured upon penetration by roots. The cohering means preferably is non-rigid so that the surface covering may be rolled and unrolled without difficulty and thereby facilitate ease of transportation and temporary storage of the surface covering in roll form.

Where grass is required to grow in partly-closed compartments the interconnections between strips may be apertured or shaped to provide drainage holes to prevent water-logging of the grass. It will thus be appreciated that the invention is particularly suitable for the provision of portable grass surfaces and the like.

Where a surface is too soft, as for example a muddy region around a gate to a field which is used as a car park during a race meeting, use may be made of structures in accordance with the present invention to assist in retaining an even ground surface in said region and to provide a surface on which vehicle wheels may grip. Where it is intended to improve ground properties on a substantially permanent basis, compartments may be filled at least partly with seeded earth and grass allowed to grow around the structure which will then serve to retain the grass and maintain a substantially even load-supporting ground surface.

In horse-racing applications, structures in accordance with the invention may be used to provide an all-weather gallop surface, and the structure may be laid on a base of limestone chippings or other suitable material which provides drainage. Compartments may be filled at least partly with a ballast material such as sawdust or wood chippings, or grass allowed to grow therethrough.

Structures in accordance with the invention are suitable also for forming rough roads, material such as sand and gravel optionally being provided and retained in the compartments between the strips of the structure.

They may also be used to provide shock absorbing resilient surfaces for helicopter landing pads, and these may be laid on aircraft landing areas.

Particularly where the structure is to be used in contact with earth it is preferably formed from a material which is substantially non-rotting and resists microbiological attack.

The required general compression modulus, resilience, and rebound characteristics of the structure may be obtained by the appropriate selection of materials, such as rubber, polyurethane, or polyvinyl chloride, for the strips and by the use of strips of appropriate cross-sectional shape as discussed above. Preferably the material is provided with a reinforcement, for example a fabric reinforcement, to increase its strength and bending resistance. Additionally or alternatively this may also be obtained by appropriate angling of strips; variation in the angle of disposition of the strip will vary the proportion of an applied load taken by bending and twisting as compared with that taken by direct compression.

Compression and rebound characteristics may also be provided, separately or additionally from the above-mentioned means by offsetting some at least of the strips as previously described to allow deformation of the offset strips between interlocking positions of the compartmented structure.

In addition for use as ground surface coverings, resilient structures in accordance with the present invention are suitable also for use in packaging including resilient cushioning or bedding arrangements.

Several embodiments of the invention will now be described, by way of example, with reference to the accompanying diagrammatic drawings in which.

Figure 1:
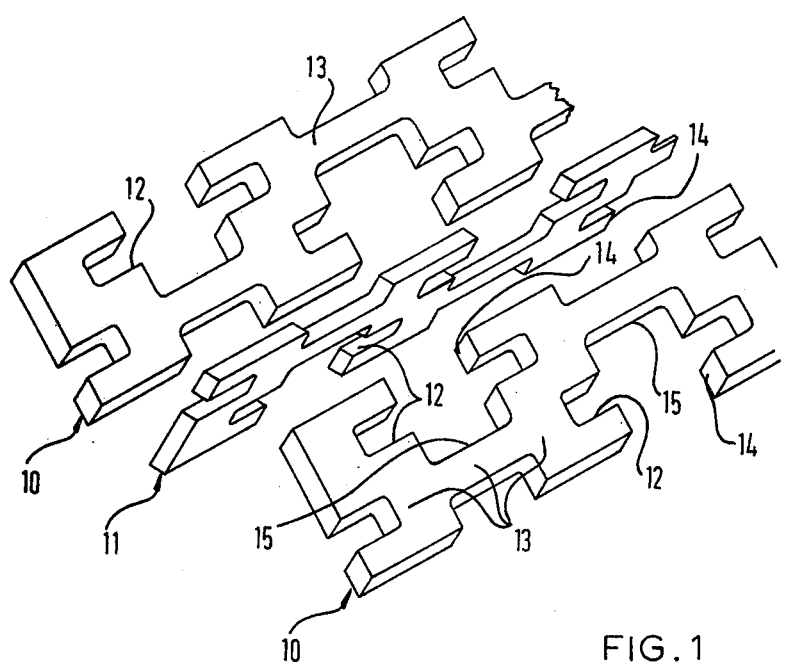
FIG. 1 is an exploded perspective view of an end part of a three-dimensional part structure in accordance with the present invention.
Figure 2:
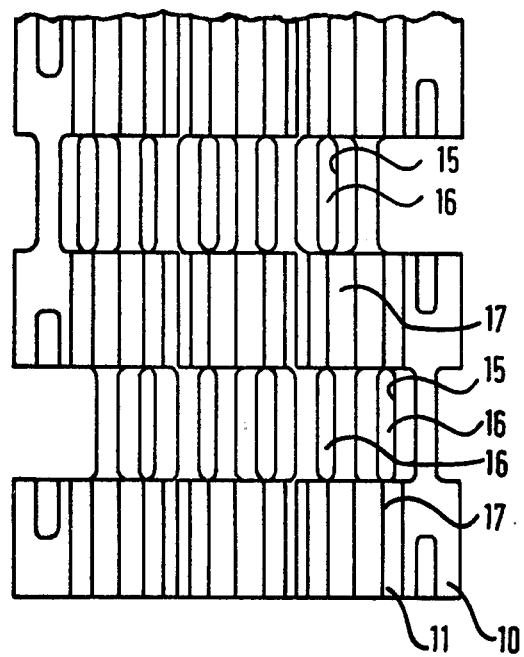
FIG. 2 shows a plan view of a plurality of strips of the part structure of FIG. 1 assembled together.
Figure 3:
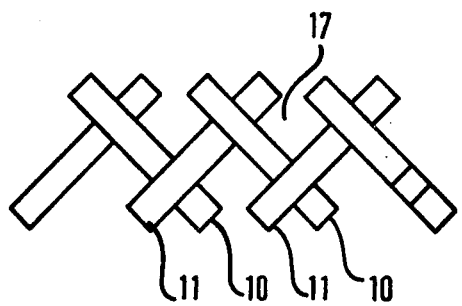
FIG. 3 shows an end elevational view of the structure of FIG. 2.

In a first embodiment of the invention, illustrated in FIGS. 1 to 3, a three-dimensional structure for use as a ground surface covering comprises a plurality of deformable first strips 10 of rectangular cross-sectional shape and a plurality of identical deformable second strips 11.

The material for forming the strips is prepared from uncured scrap reinforced-rubber such as that generated in tire manufacture. The scrap material is granulated to chop the reinforcement filaments into lengths of up to one inch, the granulated material then milled on its surface calendered into sheet form, and finally vulcanized before being stamped out in the required strip form.

Each strip is formed with complex apertures 12 at regular intervals along the strip in the region of both edges of the strip, and the apertures are so shaped and spaced that the material between the successive apertures associated with one edge of the strip constitutes profiled regions 13 which co-operate with an aperture of an adjacent strip, while profiled regions between apertures of said adjacent strip are located within the first referred to apertures so as to ensure positive but subsequently detachable location of the two strips when assembled.

The strips 10,11 are each cut to form slots 14 extending into and between apertures 12 and the edges of the strips as shown in FIG. 1.

The walls of the apertures 12 and profiled regions 13 extend substantially perpendicular to the surfaces of the strips and thus, in this embodiment of the invention, in the assembled structure adjacent strips are disposed at right angles to each other and each at 45° to the general plane in which the structure lies as shown in FIG. 3.

The apertures are each formed with recess regions 15 lying substantially at the center of the strip opposite and of a width substantially equal to the slot 14 associated with the aperture. In the assembled structure these regions provide openings 16 (see FIG. 2) through which ballast may pass, water drain, or grass grow. In contrast, the material between the apertures of a strip in the length of the strip will co-operate so as to form an effectively continuous surface in a direction perpendicular to the length of each strip and thereby form a series of partly-closed compartment regions 17 in which ballast material may be retained.

The first and second strips are assembled by deforming the material of one strip in the regions of the slots to permit insertion of the profiled regions of a second strip progressively into each of the apertures, with the material in the region of the second strip thereby positively located within the aperture.

In use of the surface covering so formed, the application of a load over an area of the covering causes bending and deformation of the strips and the covering will present an increasing resistance to deformation when compressed. As discussed earlier in the specification this and other characteristics may be selected as desired by suitable choice of materials, sizes, cross-sectional shapes and relative disposition of the strips. The filling or ballast in the compartments can, by the amount or by the type of materials selected, be used to modify or adjust the compression and rebound characteristics of the structure and also its gripping properties and appearance.

If the covering is buried in earth just below ground surface and has grass growing therein the compartments will assist in retaining the grass in position even under extremely wet conditions. The angling of the strips relative to the ground surface is found in this case to be particularly beneficial in keying the covering to underlying earth and improving stability of the structure.

Figure 4:
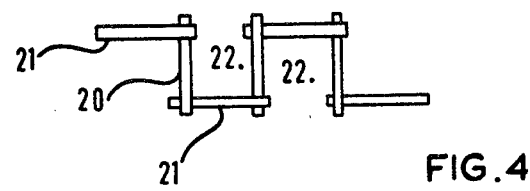
FIG. 4 shows an elevational view of part of an alternative structure in accordance with the present invention.

In a second embodiment of the invention (illustrated in FIG. 4) strips are constructed substantially as described in respect of the preceding embodiment of the invention but the strips 20,21 are connected such that successive strips are vertical and horizontal relative to the general plane containing the structure, thereby forming a series of compartments 22 of rectangular cross-sectional shape.

Those parts of the strip edges between the slots or cuts assist in providing a good grip for the structure to resist slipping relative to a supporting surface and allow a good grip to be obtained on the structure by for example people, horses, or vehicles moving thereover.

Figure 5:
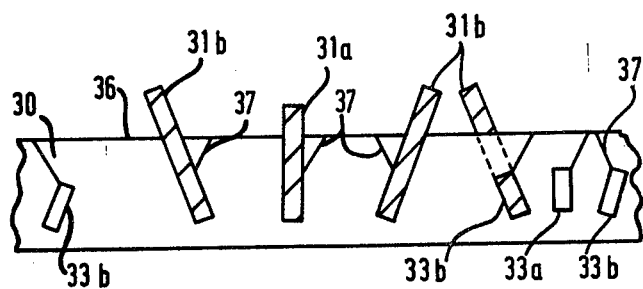
FIG. 5 shows a sectional side elevation on the line I—I of FIG. 6 of a further three-dimensional structure in accordance with the present invention.
Figure 6:
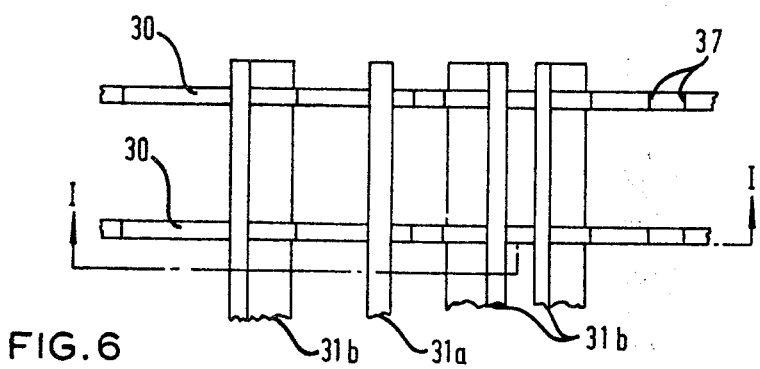
FIG. 6 shows a plan view of the structure of FIG. 5.
Figure 7:
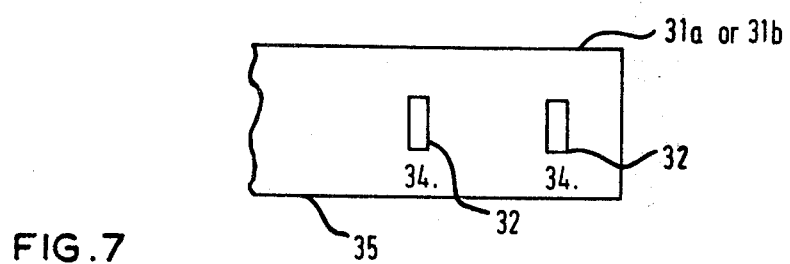
FIG. 7 shows an elevational view of a second strip of the structure shown in FIGS. 5 and 6.

In a third embodiment of the invention, illustrated in FIGS. 5 to 7, a three-dimensional structure for use as a ground surface covering comprises a plurality of deformable first strips in the form of a fabric-reinforced polyvinyl chloride strip 30 of rectangular cross-sectional shape and a plurality of deformable second strips 31a, 31b also of a rectangular cross-sectional shape and also formed from fabric-reinforced polyvinyl chloride material.

Each second strip 31a, 31b is formed at regular intervals with an aperture 32 and each strip 30 is formed at intervals with an aperture 33a, 33b of a shape which co-operates with the material of a second strip in the region 34 between an aperture 32 formed therein and a lower edge 35 of the strip to ensure positive location of the two strips when assembled.

The apertures 33a, 33b formed in a first strip 30 may be considered as in groups of three repeated along the length of the strip. A central rectangular aperture 33a of the group is formed with longer edges of the aperture perpendicular to the edges of the strip and said aperture 33a lies between two apertures 33b symmetrically disposed on either side thereof and angled relative thereto as shown in FIG. 5. As shown in FIG. 5 the central aperture 33a locates a strip 31a of a narrower width than strip 31b located within angled aperture 33b and the width of strips 31a are such that, while all strips 31a, 31b protrude beyond the plane containing upper edges 36 of the first strips 30, the strips 31a protrude less than the strips 31b. However, the lower edges of the strips 31a, 31b are inset from the lower edge of the strips 30.

Each rectangular aperture of each second strip has its longer edges perpendicular to edges of the strip such that in the final assembly each first strip 30 lies in a plane perpendicular to the direction of the length of a second strip.

The first strips 30 are each cut to form slits 37 extending between apertures 33a, 33b and the upper edge 36 of the strip, and as shown in FIG. 5 each slit is angled relative to a longer edge of the aperture 33a, 33b from which it extends. Thus in the assembly each slit is angled relative to a plane containing that strip located within the aperture associated with the slit in its final assembled position.

The first and second strips are assembled by deforming the material of the first strip 30 in the region of the slits to permit insertion of a second strip into each aperture with the material in the region of the second strip positively located within the aperture.

Since the apertures are cut directly, as opposed to obliquely, through the strips in the direction of the thickness of the strips, in the resulting assembly the first and second strips lie substantially perpendicular to each other and define therebetween compartments of a substantially rectangular cross-sectional shape.

In use of the surface covering so formed initial application of a load over an area of the covering causes bending and deformation of the angled strips 31b while further application of load cause the vertical strips 31a and then first strips 30 to be compressed and to deform. The covering thereby presents an increasing resistance to deformation when compressed and as discussed earlier in the specification this and other characteristics may be selected as desired by suitable choice of materials, sizes, cross-sectional shapes and relative disposition of the members. A filling of ballast in the compartments can, by the amount or by the type of materials selected, be used to modify or adjust the compression and rebound characteristics of the structure.

Figure 8:
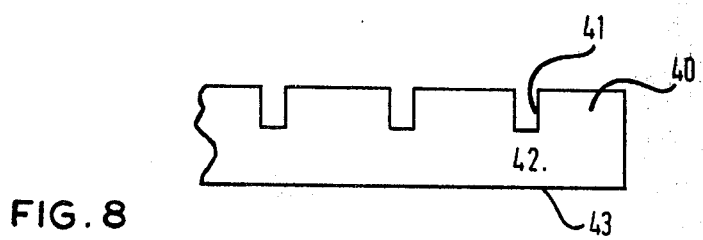
FIG. 8 shows an elevational view of an alternative second strip.

In a fourth embodiment of the invention first strips are constructed substantially as described in respect of the preceding embodiment of the invention but the second strips 40 are each formed at intervals with notches 41 of rectangular cross-section as illustrated in FIG. 8 of the accompanying drawings. In three-dimensional structures employing strips of this kind the material of the second strip in the region 42 between a notch and a lower edge 43 of the strip is arranged to be located within an aperture of a first strip.

While in the embodiments described the strips are mechanically interlocked and may subsequently be detached or separated into sections for transport or storage, the strips may additionally be secured together by the use of adhesives, or fusing (in the case of thermoplastic materials), and/or film covering by means of, for example, a dipping process.

Having now described our invention - what we claim is:

1. A resilient open-compartmented three-dimensional structure comprising an interlocked assembly of a plurality of resilient deformable strips of polymeric material extending parallel to each other, the strips being formed with apertures and projections in the resilient material thereof such that at least one strip of the plurality links at intervals along its length between two other strips of the plurality by inter-engagement of projections and apertures, each strip being inclined relative to the plane of the structure.

2. A resilient structure according to claim 1 wherein each strip is formed with both apertures and projections.

3. A resilient structure according to claim 1 wherein at least one strip is formed with apertures at intervals along each edge of the strip and at least one other strip is formed with projections at intervals along each edge of the strip.

4. A resilient structure according to claim 1 wherein some strips protrude relative to other strips of the structure at at least one of the edges of the structure in the direction of the lengths of the strips.

5. A resilient structure according to claim 1 wherein at least one strip is arranged normally to lie in a plane disposed substantially perpendicular to the plane containing an adjacent strip.

6. A resilient structure according to claim 1 wherein successive strips are disposed at equal angles of inclination to the general plane in which the assembly of strips lies.

7. A resilient structure according to claim 1 wherein a projection of one strip is shaped such that in co-operation with the shape of an aperture in a successive strip the two strips are restrained from relative angular movement.

8. A resilient structure according to claim 1 wherein the structure comprises compartments which are open at substantially only one surface of the structure.

9. A resilient structure according to claim 8 wherein drainage holes are provided to permit water to drain through the compartments.

10. A resilient structure according to claim 8 wherein the compartments are at least partly filled with a ballast material.

11. A resilient structure according to claim 1 wherein said structure comprises a ground surface covering.

* * * * *